United States Patent [19]

Shimp

[11] 3,818,275
[45] June 18, 1974

[54] CIRCUIT INTERRUPTER INCLUDING IMPROVED TRIP CIRCUIT USING CURRENT TRANSFORMERS

[75] Inventor: Alan B. Shimp, Monroeville, Pa.

[73] Assignee: Westinghouse Electric Corporation, Pittsburgh, Pa.

[22] Filed: Jan. 30, 1973

[21] Appl. No.: 327,973

[52] U.S. Cl. ............ 317/33, 317/36 TD, 317/33 C, 317/33 SC
[51] Int. Cl. ............................................ H02h 7/20
[58] Field of Search............ 317/36 TD, 33 C, 27 R, 317/26, 29 R, 38, 33 SC

[56] References Cited
UNITED STATES PATENTS
2,608,606   8/1952   Sonnemann ......................... 317/26
3,573,555   4/1971   Lipnitz ............................. 317/36 TD Primary Examiner—J. D. Miller
Assistant Examiner—Pat Salce
Attorney, Agent, or Firm—M. J. Moran

[57] ABSTRACT

A circuit breaker having an improved tripping system including a current transformer of the non-saturating type for coupling current in a line to be protected through a bridge network to an electrical circuit. The electrical circuit performs the dual functions of monitoring the output signal from the bridge circuit to determine if a time delayed tripping action should be performed and of providing energy to the trip coil of the circuit breaker for causing actuation thereof at the appropriate time. The previously mentioned dual function circuit has the characteristics of only monitoring the signal from the bridge before tripping is initiated and not supplying any energy to the trip coil and only supplying energy to the trip coil after tripping is initiated and not monitoring any signal from the bridge.

18 Claims, 5 Drawing Figures

CIRCUIT INTERRUPTER INCLUDING IMPROVED TRIP CIRCUIT USING CURRENT TRANSFORMERS

CROSS-REFERENCE TO RELATED APPLICATIONS

This invention is related to those disclosed in copending application Ser. No. 327,965, by Alan B. Shimp et al. filed Jan. 30, 1973 and copending application Ser. No. 327,963, by Alan B. Shimp filed Jan. 30, 1973 and copending application Ser. No. 327,972, filed Jan. 30, 1973 by Alfred E. Maier et al.

BACKGROUND OF THE INVENTION

This invention relates to circuit breakers including trip circuits in general and specifically to circuit breakers including time delayed circuit breaker trip circuits using non-saturating current transformers as input sensors.

In certain types of electrical apparatus, such as those described in U.S. Pat. Nos. 3,327,171; 3,334,272; 3,416,035; 3,434,011 and 3,444,434, various static, time delayed circuit breaker control systems are described. In all of these patents a current sensor, which is usually a current transformer, is used to sense current in a conductor of an electrical system to be protected. This information is supplied to an electrical circuit where a timing sequence is begun after a certain level of overload current is sensed in the line to be protected after which a circuit breaker trip coil is energized thus causing the main contacts of the circuit breaker to be opened thus protecting the line. However, the apparatus described in the above-mentioned patents have certain disadvantages. One of the disadvantages is the fact that the control circuits or systems disclosed require information and energy from the line current. The information is used to begin the timing sequence and the energy or power is used to trip the circuit breaker. In all cases, energy is supplied to both the signal sensing portion of the circuit and the trip coil after a tripping cycle has been begun. In other cases, saturating current transformers are required so that the portion of the circuit used for sensing the presence of overload current may be protected when the line current exceeds an extremely high value as is usually the case when catastrophic faults, such as ground faults or direct short circuits occur. Another disadvantage lies in the fact that the resistor or other means for sensing the presence of overload current cannot easily be changed or be replaced in the circuit for thereby changing the value or values of overload current at which certain circuit breaker functions occur. In some instances, the prior art requires that special energy storage capacitors be included as part of the circuit breaker control system so that a source of energy is available for energizing the trip coil of the circuit breaker once a tripping function or operation has been begun. It would be advantageous therefore to provide a circuit breaker control system using non-saturating current transformers as input sensors for the control system in which sensing of the amount of current in the line to be protected is accomplished before tripping of the circuit breaker with no energy being provided to the trip coil of the circuit breaker while after the initiation of the tripping function in the circuit breaker all of the energy is supplied to the trip coil and none is supplied to the sensing portion of the circuit. It would be advantageous to provide a circuit breaker including an improved control system in which a single resistor or resistive element could be conveniently and easily replaced for changing the effective current rating of the circuit breaker.

SUMMARY OF THE INVENTION

In accordance with the invention, a circuit breaker including a control system is disclosed for single phase or polyphase electrical lines in which current transformers provide an electrical signal or electrical energy indicative of the level of current flowing in any of the lines to be monitored to a bridge rectifier circuit. The output terminals of the bridge circuit provide energy to a control circuit which is so arranged as to provide information concerning the level of the current in the line to be protected to a timing circuit only and to provide substantially no energy to an associated trip coil. Conversely, after a tripping signal has been provided at the output of the time delayed portion of the previously described circuit and the trip coil has been initially energized, current or information is no longer provided to the sensing part of the circuit but substantially all energy is directed to the trip coil to aid in or actuate the tripping of the circuit breaker. This function is accomplished by providing a sensing lead or line between the information part of the control circuit and the trip coil.

BRIEF DESCRIPTION OF THE DRAWINGS

For a better understanding of the invention reference may be had to the preferred embodiments, exemplary of the invention, shown in the accompanying drawings, in which.

DESCRIPTION OF THE PREFERRED EMBODIMENT

Figure 1:
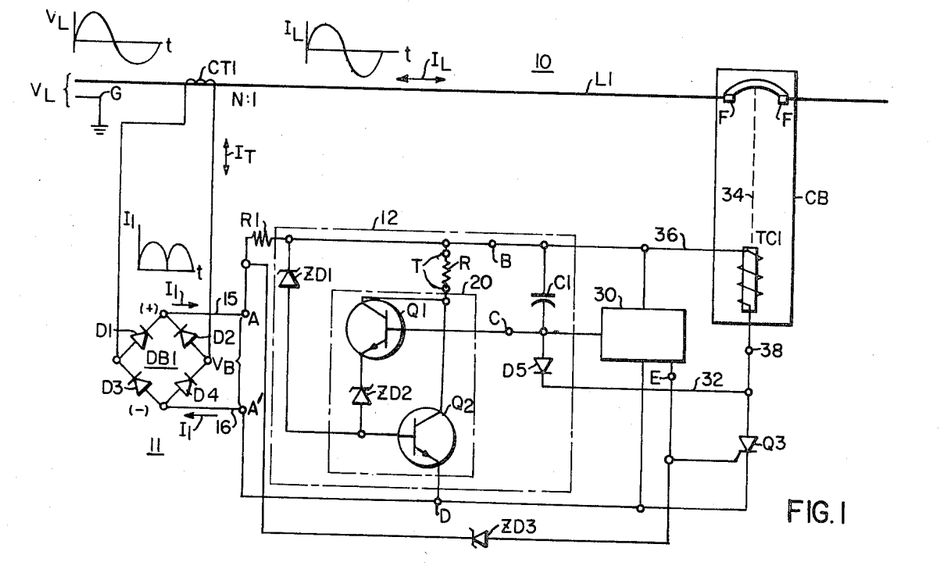
FIG. 1 is a diagrammatic view of a single phase line protected by a circuit breaker including the control circuit embodying the invention.

Referring now to the drawings and FIG. 1 in particular, an electrical system 10 including a single phase line or lead L1, a circuit breaker CB and a monitoring system or energy sensing means 11 to which is electrically connected a solid state or static type control system 12 is shown. The output of the circuit 12 is connected to a timing circuit 30 which provides energy for actuating a static switch or control means Q3 for energizing the trip coil TC1 of the circuit breaker CB to thereby open the main contacts FF to protect the previously described line L1. Line L1 may have flowing therein bidirectional or alternating current IL. The voltage impressed between line L1 and the ground or system common G is designated VL. It is to be understood that system common G may be replaced by another electrical line or conductor similar to L1 and that the operation of the control system 10 is not dependent upon the voltage VL being developed between line L1 and a ground terminal exclusively. Possible wave shapes for the current IL and voltage VL associated with line L1 are shown. The current IL and voltage VL may be sinusoidal in shape and may be in phase with each other or they may be non sinusoidal and/or out of phase with each other.

In one embodiment of the invention, a sensor or non-saturating current transformer CT1 is magnetically coupled with line L1. The output terminals of current transformer CT1 may be connected to the input terminals of a full wave bridge rectifier circuit DB1. The output terminals of the full wave bridge rectifier circuit DB1, which are generally designated A–A' may be connected in a plus-to-minus voltage and current relationship to lines or leads 15 and 16, respectively. Lines 15 and 16 thus have impressed thereacross a voltage VB at terminals A–A' and have flowing therethrough a current I1 when a load, such as indicated by circuit 12, is connected thereto. The unidirectional pulsating characteristic of current I1 may be as depicted in FIG. 1.

The combination sensing and empowering or energizing circuit 12 includes a Zener diode or similar voltage regulating means ZD1, the cathode of which may be connected to one end of a resistor R1, the other end of which is connected to line 15. The anode of Zener diode ZD1 is connected to the base of a transistor or amplifying element Q2. Also connected to line 15 is one end of a resistance means or resistor R, the other end of which is connected to the collectors of the previously described transistor Q2 and another transistor or amplifying element Q1. Resistor R may be variable or in another embodiment of the invention an/or may be removable at terminals TT so that another resistor R having another resistive value may be placed across teriminals TT to thereby change the current rating or value at which circuit breaker CB is actuated to open separable main contacts FF. Resistor R may also be an adjustable two point potentiometer. A regulating Zener diode or similar means ZD2 is connected at its cathode to the emitter of the transistor Q1. The anode of Zener diode ZD2 is connected to the anode of Zener diode ZD1 which is, as mentioned previously connected to the base of the previously described transistor Q2. The emitter of transistor Q2 is connected to a common point D which is part of the previously described negative lead or line 16. It is to be understood that the positive to negative relationship of the previously described lines 15 and 16 are chosen so that the transistors Q1, Q2 and the Zener diode ZD1 and ZD2 and other polarized static or solid state elements in the control circuit 10 are properly oriented for current conduction when desired. Specifically, in this embodiment of the invention, transistors Q1 and Q2 are NPN transistors or similar static devices. The combination including the transistors Q1 and Q2 and Zener diode ZD2 may be considered as a combination regulating-switching means 20 having one input terminal connected to one end of the resistive means R and having a common or ground terminal at point D and an output terminal at point C which corresponds to the base of the transistor Q1.

A capacitive element or capacitor C1 is connected between the line 15 and the base of transistor Q1 which is also designated as terminal C. Capacitive element C1 which is generally connected in parallel with the series combination of the resistive means R and the collector to base circuit of transistor Q1 provides the function of sensing the maximum value of a pulsating voltage which is impressed across the resistive element or resistor R due to the presence of the pulsating current I1. Capacitive element C1 also acts as a source of electrical current or charge for the base of transistor Q1 for a purpose which will be described subsequently. Also connected to common terminal C or to the base of transistor Q1 and to the lower side of capacitor C1 is the anode of a diode or unidirectional current passing element D5, the cathode of which is connected by way of line 32 to an electrical lead or line 38 which, in turn, is connected to one side of the trip coil TC1 of the circuit breaker CB and to the anode of a silicon controlled rectifier or similar switching means Q3. The trip coil TC1 is connected at its other end at terminal 36 to the previously described line 15. The capacitive element C1 may be generally thought of as being connected between two output terminals B and C of the previously described combination sensing and empowering circuit 12. Part of the electrical system or circuit 10 includes a timing circuit 30 which may otherwise be known as a time delay and instantaneous trip actuating circuit. Time delay and instantaneous circuit or timing circuit 30 has a pair of input terminals connected across the previously described capacitive element C1 or said in another way between terminals B and C of the previously described circuit 12. The timing circuit 30 also has a set of reference signal input terminals connected between the terminals C and D of the previously described circuit 12. The timing circuit 30 has an output terminal E which is connected to the gate terminal or control terminal of the silicon controlled rectifier or switching means Q3. The resistive element R may be of such a value that a predetermined value of current I1 flowing in lead L1 will cause an initiation of a timing cycle in the timing circuit to thereby subsequently cause energization or turning on of the silicon controlled rectifier Q3 to thereby cause energization of trip coil TC1 to thereby cause movement of plunger or mechanical linkage 34 to open contacts FF of circuit breaker CB and provide an open circuit in line L1 to thus interrupt current I1. A Zener diode ZD3 may be connected at its regulating end between one end of resistor R1 and terminal A and at its other end to the gate of silicon controlled rectifier Q3 so that if an extraordinary amount of current flows through resistor R1 due to a failure in system 10 the circuit breaker CB will be opened because of the condition of Zener diode ZD3. This is a fail safe element of the system 10.

The previously described diode bridge network DB1 comprises four diodes or diode members D1, D2, D3 and D4.

In operation, the presence of a current I1 flowing in line L1 causes energization of the non-saturating current transformer or similar sensing means CT1 which, in turn, generates the alternating or similar transformer secondary current IT which is provided or applied to the input terminals of the previously described bridge network DB1, at the output terminals of which is provided the proportional or related unidirectional output current I1. Current I1 is provided to the combination sensing and empowering circuit or network 12 where an informational signal is impressed across the resistor R, which signal is proportional to the level of current I1. This informational signal is used to provide information at terminals B and C of the previously described timing circuit 30. At this point in time, the silicon control rectifier Q3 is substantially non-conducting and, consequently, substantially no current flows through trip coil TC1 and substantially all the electrical energy provided by the current transformer CT1 from line L1 is used for providing signal or informational energy to the timing circuit 30 by way of the combination sensing and empowering circuit 12 and virtually none of that above-mentioned energy flows through the trip coil TC1.

The regulating properties of the previously described combination regulating and switching means 20 insure that the voltage VBD between terminals B and D which is the same as the voltage between terminals A and A' is a predetermined DC voltage the level of which increases with an increase in the peak value of current I1 flowing in lead L1. The regulating characteristics associated with the regulating and switching means 20 will be described more completely. A generally fixed or predetermined level reference voltage is impressed across terminals C and D of the network 12 against which is measured or compared the voltage across terminals B and C which may vary in proportion to the level of the current I1 flowing in lead L1. Consequently, when the current I1 exceeds a predetermined value, a timing operation is begun within circuit 30 which thereafter leads to the energization of silicon controlled rectifier Q3, which thereby completes a circuit between terminals B and D of the previously described combination sensing and empowering circuit 12 whereby current flows through trip coil TC1 to empower it. At the same time, a signal is provided by way of line 32 and diode D5 to the combination regulating and switch means 20 causing means 20 to switch off or to prevent conduction of electrical current through the resistive means of resistor R. This means that before tripping virtually all of the energy in line L1 at any instant of time is used for sensing purposes and after tripping substantially or virtually all of the energy at any instant of time is used to empower the trip coil TC1 and virtually or substantially none is used for sensing purposes. The sensing portion of the circuit or network 12 is inactive or inhibited at this time.

Figure 2:
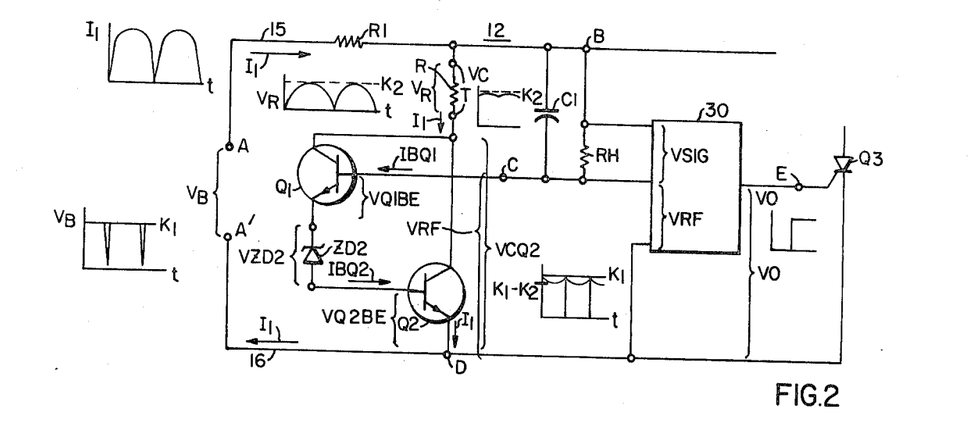
FIG. 2 is a schematic diagram of a portion of the electrical circuit shown in FIG. 1 which is directed at providing information to the timing circuit shown in FIG. 1.

Referring now to FIG. 2, the detailed operation of the portion of the circuit 12 associated with sensing the level of current I1 flowing in line L1 will be described. Current I1 is shown flowing into terminal A at line 15 and out of terminal A' at line 16. This current I1 is depicted in FIG. 2. The voltage between points A–A' or between lines 15 and 16 is shown in the graph associated therewith as voltage VB which is at a generally constant or predetermined level K1. The reason for this substantially constant voltage VB will be described subsequently.

Current I1 flows substantially entirely through resistive element or resistor R because the silicon controlled rectifier or switching means Q3 is substantially non-conducting or open at this time, thus allowing substantially no current to flow through the trip coil TC1 shown in FIG. 1. A voltage is therefore developed across the resistive element R or between the terminals TT. This voltage is indicated as VR and it is substantially proportional to the amount of magnitude of current I1 flowing through resistive element R. Its wave shape is shown and labeled as VR. The maximum level or peak level of voltage VR is designated as K2. This peak level of voltage VR is substantially proportional to the amount of current IL flowing in line L1. A relatively large resistive element RH is connecting between the base of transistor Q1 and the terminal B or between terminals B and C or in parallel with capacitive element C1. Because of the relatively high resistive value of resistive element RH when compared with the value of resistor or resistive element R, most of the current I1 flows through resistive element R.

A portion of current I1 flows into the collector-emitter circuit of transistor Q1 and thence through the Zener diode ZD2 into the base-to emitter circuit of transistor Q2 and from there to the common point D of the line 16. It will be noted that regardless of the amount of current I1 flowing, the voltage drop VQ2BE across the base to emitter circuit of transistor Q2 is substantially constant. In a similar manner, the voltage drop VZD2 across the conducting Zener diode ZD2 is also generally constant or substantially a predetermined value. Finally, in a similar manner, the voltage drop VQ1BE across the base-to-emitter junction of the transistor Q1 is also substantially constant. Consequently, the voltage drop between terminal C or the base of transistor Q1 and terminal D or line 16 or the emitter of transistor Q2 is substantially constant or a predetermined value and is generally designated VRF or the reference voltage for the timing circuit 30. Since capacitive element C1 is connected to the series combination of the resistive element R and the emitter-base circuit of transistor Q1, the value of the voltage across the capacitor C1 will be generally equal to the peak value of the voltage VR, as described previously, or said in another way, will be a substantially constant DC value generally equal to the value K2 as shown by graph VC. Consequently, as the peak or maximum value of the pulsating voltage VR of the sensing resistor or sensing element R increases or decreases, the level K2 or voltage VC across capacitor C1 increases or decreases substantially proportionally. This voltage which is also the voltage across resistive element RH is indicated as VSIG and is the input signal to timing circuit 30 and is compared with or against the other input signal VRF to determine when a timing operation should begin.

It can be seen that as the peak value of the current IL in the line L1 increases, the value of the current I1 will increase generally proportionally over a predetermined range and consequently, the peak value K2 of the voltage VR will increase, causing the voltage VC across capacitor C1 to increase proportionally. Voltage VC is therefore substantially proportional to the peak of the current I1 in lead L1. Voltage VC may be preselected at a predetermined value to cause the timing circuit 30 to react or respond thereto to thus cause a voltage VO to be produced at the output terminal of timing unit 30 for subsequently tripping the circuit breaker CB. As described previously, even though the characteristic of the current I1 is unidirectional and pulsating, the voltage VB is generally a direct current voltage of a level K1. Value K1 may increase or decrease but it is generally non-pulsating compared with the current I1. Voltage K1 is generally equal to voltage VRF plus voltage VC. It is important for voltage VB to be generally fixed and non-pulsating, because the voltage VB is the power supply voltage for the elements of the timing circuit 30 and it is inadvisable to have the power supply voltage for static control circuits to vary or be pulsating significantly. It is more advisable for the power supply voltage to be at a fixed or predetermined level. However in order to insure this, that is, in order for current I1 to be sinusoidal and pulsating and for voltage VB to be at a generally fixed level K1 over any small period of time, it is necessary for the voltage VCQ2 or the voltage between the lower end of the resistive element R and the terminal D to be specially shaped, as shown in the graph VCQ2. It can be seen that this represents a voltage which sinusoidally varies from a higher value of K1 to a lower value of K1-K2 and back to a higher value of K1 once every half cycle of alternating current I1, when the voltage disappears to return again during the next half cycle. The turning off or dropping of the voltage VCQ2 at each half cycle is due to the fact that the voltage drops across the elements Q1, Q2 and ZD2 decrease as the current I1 goes to zero during each half cycle. Otherwise, each of these elements conducts with a generally fixed value of voltage thereacross, as previously discussed. In order for the shape of the voltage drop VCQ2 across the collector to emitter circuit of transistor Q1 to be as shown in the graph identified as such, it is necessary for base current IBQ1 to be drawn from capacitive elements C1 to thereby provide or apply base current IBQ2 to the base of transistor Q2. The current flowing out of the emitter of transistor Q1 or the current IBQ2 must decrease when the current I1 decreases. When this happens, less current must be drawn into the base of transistor Q1 from capacitor C1 to compensate for the decrease in current I1. This causes the voltage from the collector to emitter of transistor Q2 to increase in correspondence to the decrease of the voltage drop across the resistive element R1 which is dependent on I1 thus providing a total voltage drop VB which is generally constant or a predetermined and equal to the value K1. It should be noted that when the current I1 is at its highest value, the voltage VCQ2 is at its lowest value except for complete turnoff, which occurs once during each half cycle. Similarly, when current I1 is at its lowest value, the value of the base current IBQ2 of transistor Q2 is at its lowest value and consequently, the voltage drop across the collector to emitter (VCQ2) is at it highest value.

In summary, it can be seen that the amount of current IBQ1 which is drawn from the capacitor C1 is always sufficient to compensate for the changes in the current I1 to thereby cause the voltage VCQ2 to vary in such a manner as to compensate for the changes in voltage across resistor R even though the voltage value VB must be substantially constant because it is equal to the fixed voltage drop VQ2BE across the base to emitter of transistor Q2 plug the fixed voltage drop VZD2 across the Zener diode ZD2, and the fixed voltage drop VQ1BE across the base to emitter of transistor Q1 and the generally fixed voltage drop VC across the capacitor C1. Once the output voltage VO is impressed between terminals E and D of circuit 30 or, said in another way, once silicon controlled rectifier Q3 conducts, the voltage at the anode of Q3 drops from the voltage at point 36 or the voltage on line 15 to virtually or substantially the voltage at line 16. Consequently, diode D5 as shown in FIG. 1 is made to conduct. This has the effect of reverse biasing the base to emitter junction of transistor Q1 and turning it "off" which causes the base to emitter junction of transistor Q2 to turn off and consequently prevent current flow through resistive element R. As a result, all the current which was flowing through resistive element R is now available for energizing trip coil TC1, or said in another way, all the energy provided from the current I1 flowing in line L1 as converted by the current transformer CT1 and bridge DB1 is provided substantially exclusively to energize the trip coil TC1. Voltage A-A' is now equal to current I1 time the resistance of coil TC1. Zener diode ZD1 conducts whenever the value of current I1 times the resistance of coil TC1 equals the breakdown voltage of ZD1. Zener diode ZD1 thus can be made to clamp the voltage VB to a valve below the maximum safe operating voltage of Q1 and Q2.

Figure 3:
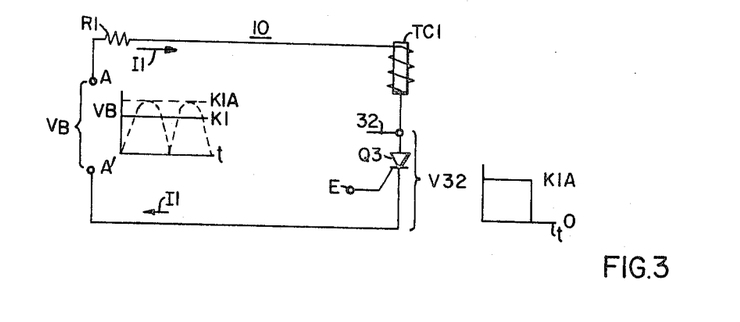
FIG. 3 is a diagrammatic view of another portion of the circuit shown in FIG. 1 showing a portion of that circuit which is directed toward supplying energy to the trip coil.
Figure 4:
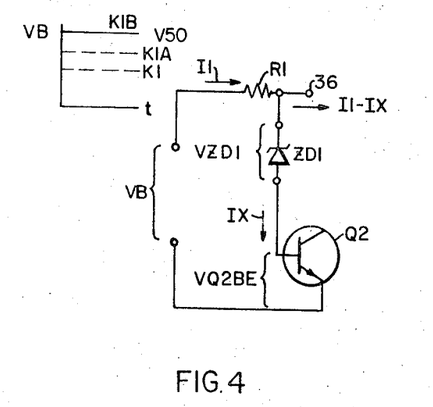
FIG. 4 is another diagrammatic view of a portion of the circuit shown in FIG. 1 directed at providing catastrophic overload protection to the circuit of FIG. 1.

Referring now to FIG. 3, that portion of system 10 associated with the flow of electrical energy or current through trip coil TC1 is depicted. It will be noted that a voltage drop V32 is normally impressed between terminal 32 and terminal 16, or said in another way, voltage drop V32 is impressed across the anode to cathode circuit of the silicon controlled rectifier Q3. This voltage drops from the value of K1A to virtually zero when the silicon controlled rectifier is energized at its gate terminal E. Current I1 then flows through trip coil TC1 exclusively to thereby energize trip coil TC1. Voltage VB now has a value equal to the product of the current I1 times the resistance of coil TC1 because the regulating portion of the circuit comprising transistors Q1 and Q2 and Zener diode ZD2 has been effectively disconnected from the remaining portion of the circuit or inhibited by the effect of the conducting diode D5. If the voltage VB reaches the breakdown voltage of Zener diode ZD1 due to high values of current I1, the voltage VB is then clamped at a maximum value. High values of current I1 corresponds to high values of line current IL because with high values of IL current transformer CT1 will attempt to produce a proportional secondary current IT and hence current I1 regardless of the secondary burden imposed on CT1. The conduction of ZD1 provides base current to transistor Q2 to turn it on thus providing a another bypass for the excess of current I1 through R and Q2. As a result the power rating of Zener diode ZD1 can be made substantially less than would be necessary if ZD1 were required to conduct the entire excess current.

Figure 5:
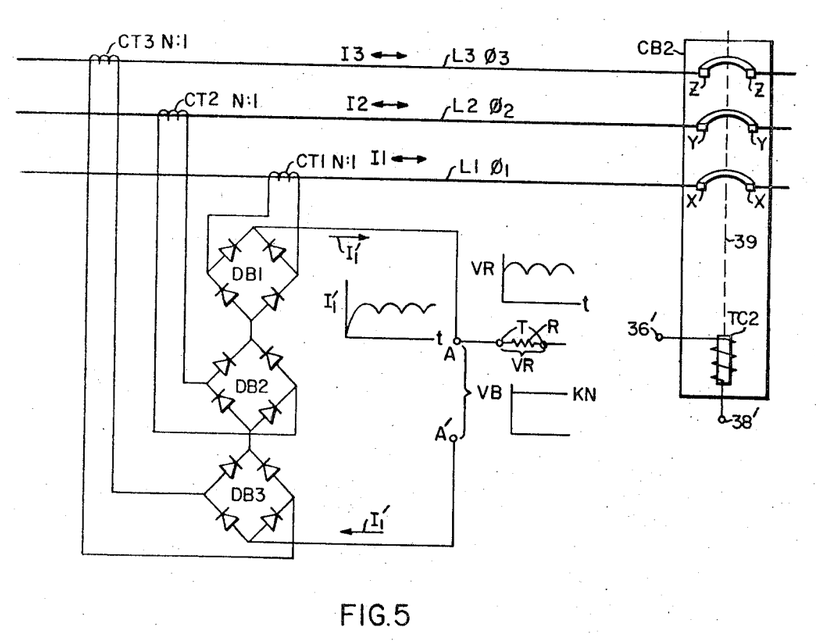
FIG. 5 is a diagrammatic view of a three-phase circuit arrangement which can be used with the control system shown in FIG. 1.

Referring now to FIG. 5, a three-phase circuit including lines L1, L2 and L3 associated respectively with phases 1, 2 and 3 may be associated with the previously described circuit 12 of system 10. The circuit breaker system CB2 is essentially the same as described before except for having three separable main contacts XX, YY and ZZ for lines L1, L2 and L3, respectively. The trip coil TC2 has terminals 36 and 38 which correspond to terminals 36 and 38 of FIG. 1. The current transformers CT1, CT2 and CT3 monitor or are magnetically coupled to lines L1, L2 and L3, respectively, and are connected at the output terminals thereof to the input terminals of diode bridge circuits DB1, DB2 and DB3, respectively. The output terminals of the latter bridge circuits are connected in series or auctioneering electrical circuit relationships to produce a current I1' which flows through resistive element R and into the previously described circuit 12 (not shown). The voltage drop VB is similar to but not exactly the same, as described previously. However, the same operating and electrical dynamic features apply. The important difference is that the voltage VR, that is, the voltage wave shape across resistive element R, is more nearly like a fixed DC voltage because it is formed from the superimposing of the currents flowing out of the various bridges DB1, DB2 and DB3, which may be spaced from each other by 120 electrical degrees, and into the resistor R as a composite signal. Current I1' is depicted graphically. Current I1' flows into and out of terminals A and A' as described previously. Voltage VB may attain a value of KN which is generally fixed or predetermined and which may vary in relationship to or with the magnitude or amount of the highest current flowing in the various lines L1, L2 and L3.

Note that if resistor R of FIG. 1 is ever removed, the only path for the flow of current I1 is into capacitor C1 since R has been removed and Q3 and ZD1 are not conducting. Now if I1 is even a very small value, corresponding to a small current IL, capacitor C1 will rapidly charge to a high voltage limited only by the clamping of Zener diode ZD1. This high voltage on C1 will provide a high signal voltage to timing circuit 30 thus indicating an apparent large overload current IL. As a result, timing circuit 30 will act to turn on Q3 thus energizing coil TC1 to trip the breaker. In summary the removal of resistor R causes a fail safe tripping of the circuit breaker if even a small load current is flowing through the breaker.

It is to be understood that the timing unit 30 may be of any kind or type provided that it meets the output requirements of the circuit 12 and the input requirement of the switching means of silicon controlled rectifier Q3. It is also to be understood that more than one circuit breaker may be controlled simultaneously by the control system disclosed herein. It is also to be understood that the line current I1 and voltage VL, respectively, need not be sinusoidal but may be of any desired waveform, provided that the various circuit elements utilized in system 10 are adjusted to react or respond accordingly. It is also to be understood that the elements R1 and ZD3 may be omitted under certain conditions and the remainder of the circuit or system will operate effectively.

The apparatus embodying the teaching of this invention has several advantages. It provides a system which efficiently utilizes the available power in the line or lines by providing only an information signal before the tripping of the circuit breaker and providing only circuit breaker trip coil power after the tripping cycle has been initiated or after the trip coil has been initially energized. Another advantage lies in the fact that no separate energy storage means, such as an energy storing capacitor, is required to actuate the trip coil, it being recalled that capacitor C1 is primarily utilized for filtering and information storing purposes and not for energy storage for empowering a trip coil. Another advantage lies in the fact that the system may respond almost instantaneously to changes in load current, such as current IL in line L1, because of the speed of response or operation of the solid state components utilized therein. Another advantage lies in the fact that excessive voltages which might otherwise damage the tripping circuit are not introduced into the circuit because of the regulation of Zener diode ZD1. Still another advantage lies in the fact that a high current transformer ratio (N:1) may be used in order to minimize power dissipation in the trip circuit. A further advantage lies in the fact that the circuit operation is affected only slightly by waveform distortion and thus is relatively insensitive to waveform distortion. It is also to be understood that for certain ratings of current two or more current tranformers, such as CT1, may be cascaded to provide adequate reduction of current IT for use in the circuit 12.

What I claim as my invention is:

1. An electrical circuit adapted to actuate the trip coil of a circuit interrupter having separable main contacts which are actuable to interconnect spaced electrical conductors, comprising:

energy sensing means having output terminals, said energy sensing means cooperating with at least one of said electrical conductors for sensing the amount of electrical energy present in said at least one of said conductors at any instant of time to thereby produce at said output terminals, an electrical signal which is related to the amount of said energy in said conductor;

a combination sensing and empowering circuit having input terminals, said input terminals being electrically connected to said output terminals of said energy sensing means for receiving said electrical signal from said energy sensing means and deriving energy therefrom, said combination sensing and empowering circuit having a first set of output terminals for providing a signal thereat related to the instantaneous state of said electrical signal from said energy sensing means and a second set of output terminals for providing power thereat related to said derived energy;

a timing circuit having an output terminal and input terminals connected to said first set of output terminals of said combination sensing and empowering circuit for thereby providing a signal at said output terminal of said timing circuit at a predetermined time after said signal related to said amount of said energy of a predetermined magnitude is present at said input terminals of said timing circuit; and switching means having main terminals which are connected in circuit relationship with said trip coil for actuating said trip coil, said switching means having an actuating terminal which is connected to said output terminal of said timing circuit, said circuit combination of said switching means and said trip coil being electrically connected in circuit relationship to said second set of output terminals of said combination sensing and empowering circuit, said switching means being actuated to a state which causes said trip coil to conduct electrical current to thereby actuate the opening of said main contacts of said circuit interrupter when said signal is present on said output terminal of said timing circuit to actuate said switching means, said sensing and empowering circuit providing said signal at said first set of output terminals thereof to begin actuation of said trip coil at said predetermined time when said latter signal is of said predetermined magnitude, but not substantially providing said power at said second set of output terminals thereof at this time, said sensing and empowering circuit providing said power at said second set of output terminals thereof after said electrical conduction in said trip coil has begun to thereby provide the energy to continue electrical conduction in said trip coil, but not substantially further providing said signal at said first set of output terminals thereof at this later time.

2. The combination as claimed in claim 1 wherein said energy sensing means comprises a current transformer.

3. The combination as claimed in claim 1 wherein said switching means comprises a silicon controlled rectifier, said main terminals thereof comprising an anode terminal and a cathode terminal, said actuating terminal thereof comprising a gate terminal.

4. The combination as claimed in claim 1 wherein said main terminals of said switching means are connected in series circuit relationship with said trip coil so that when said switching means is actuated to a conducting state electrical current flows therethrough and through said serially connected trip coil between said second set of output terminals of said combination sensing and empowering means to thereby actuate the the opening of said main contacts of said current interrupter.

5. The combination as claimed in claim 4 wherein said switching means comprises a silicon controlled rectifier, said main terminals thereof comprise an anode terminal and a cathode terminal, said actuating terminal thereof comprises a gate terminal.

6. The combination as claimed in claim 5 wherein said anode terminal of said silicon controlled rectifier is electrically connected to one terminal of said trip coil.

7. The combination as claimed in claim 1, wherein said energy sensing means comprises three current transformers each with output terminals for monitoring the instantaneous energy present in any one of three conductors in a three phase electrical system at any instant of time, three rectifier means for rectifying said instantaneous energy to thereby provide said electrical signal of said output terminals of said energy sensing means, said rectifier means having input and output terminals, each set of said output terminals of each of said three current transformers being connected to a set of input terminals of one of said three rectifier means, said output terminals of said three rectifier means being connected in series circuit relationship except that one of said output terminals of one of said three rectifier means is not connected to any other output terminal of any of said rectifier means and comprises one output terminal of said energy sensing means and another of said output terminals of said three rectifier means is not connected to any other output terminal of any of said rectifier means, said latter terminal comprising the other output terminal for said energy sensing means.

8. The combination as claimed in claim 7 wherein said energy being sensed is in the form of electrical current.

9. The combination as claimed in claim 1 wherein said energy being sensed is in the form of electrical current.

10. An electrical circuit adapted to actuate the trip coil of a circuit interrupter having separable main contacts which are actuable to interconnect spaced electrical conductors, comprising:

an energy sensing means having output terminals, said energy sensing means cooperating with at least one of said electrical conductors for sensing the amount of electrical energy present in said at least one of said conductors at any instant of time to thereby produce at said output terminals an electrical signal which is related to the amount of said energy in said conductor;

a combination sensing and empowering circuit having input terminals, said input terminals being electrically connected to said output terminals of said energy sensing means for receiving said electrical signal from said energy sensing means, said combination sensing and empowering circuit deriving energy from said later signal, said combination sensing and empowering means having a first set of output terminals for providing a signal thereat related to the instantaneous state of said electrical signal from said energy sensing means and a second set of output terminals for providing power thereat related to said derived energy;

a timing circuit having an output terminal and input terminal, said input terminal being connected to said first set of output terminals of said combination sensing and empowering circuit for thereby providing a signal at said output terminal of said timing circuit at a predetermined time after a predetermined magnitude of said signal related to said amount of said energy is present at said input terminals of said timing circuit, said predetermined magnitude of said later signal being related to the amount of said energy in said line conductor;

switching means for actuating said trip coil and having main terminals which are connected in circuit relationship with the terminals of said trip coil, said switching means having an actuating terminal which is connected to said output terminal of said timing circuit, said circuit combination of said switching means main terminals and said trip coil terminals being electrically connected in circuit relationship to said second set of output terminals of said combination sensing and empowering circuit, said switching means being actuated to a state which causes said trip coil to conduct electrical current to thereby actuate the opening of said main contacts of said circuit interrupter when said signal is present on said output terminal of said timing circuit to actuate said switching means, said signal at said output terminals of said energy sensing means being a voltage signal, said combination sensing and empowering circuit additionally comprising a resistance means for having impressed thereacross a portion of the instantaneous value of said voltage signal related to said electrical signal from said energy sensing means, one terminal of said resistance means being connected to one of said first set of output terminals of said combination sensing and empowering circuit, said one terminal of said resistance means being also connected to one of said output terminals of said energy sensing means, said combination sensing and empowering circuit also comprising a combination regulating switch means for assisting in actuating said trip coil and providing power to said trip coil generally nonconcurrently, said combination regulating switch means having three terminals, a first terminal being a common terminal and being electrically connected to said other output terminal of said energy sensing means, a second terminal being electrically connected to another terminal of said resistance means to thereby connect said resistance means and said regulating switch means in series circuit relationship with said output terminals of said energy sensing means, a third of said three terminals of said combination regulating switch means being connected to cooperate with said resistance means, said third terminal and said first terminal of said regulating switch means having a generally predetermined regulating voltage impressed thereacross for use in said timing circuit, said combination regulating switch means being turned off at any time said third terminal is essentially short-circuited to said first terminal, thereby preventing the flow of current through said sensing and empowering circuit from said energy sensing means due to said voltage signal of said output terminals of said energy sensing means, said third terminal and said one terminal of said resistance means comprising said first set of output terminals of said combination sensing and empowering circuit, said timing circuit having additional input terminals, said additional input terminals being connected to said third terminal and said first terminal of said regulating switch means for providing a predetermined reference voltage signal to said timing circuit against which said signal from said first set of output terminals may be electrically compared by said timing circuit, a circuit element connected between said third terminal of said combination regulating switch means and one said main terminal of said switching means which is closer in circuit relationship to said trip coil, said second set of output terminals comprising said first terminal of said combination regulating said switch means and said one terminal of said resistance means, said actuation of said switching means thereby essentially shorting said first terminal to said third terminal of said regulating switch means through said circuit element and said main terminals of said switching means to thereby turn off said combination sensing and empowering circuit, thereby providing more current to said second set of output terminals of said combination sensing and empowering circuit to cause more current to flow through said tripping coil for the continued actuation thereof, said sensing and empowering circuit thus providing said signal at said first set of output terminals thereof to begin actuation of said tripping coil at said predetermined time when said latter signal is of said predetermined magnitude, but not substantially providing said power at said second set of output terminals thereof at this time, said sensing and empowering circuit providing said power at said second set of output terminals thereof after said electrical conduction in said trip coil has begun to thereby provide the energy to continue electrical conduction in said trip coil, but not substantially further providing said signal at said first set of output terminals thereof at this later time.

11. The combination as claimed in claim 10 wherein the resistance of said resistance means may be varied.

12. The combination as claimed in claim 11 wherein said resistance means comprises any one of a group of resistors of different ohmic value each of which is useful to activate said timing circuit to thereby cause said trip coil to be actuated for a predetermined value of said energy in said conductor.

13. The combination as claimed in claim 11 wherein said resistance means comprises a variable resistor, the resistance value of which may be varied over a range sufficient to cause said timing circuit to cause said trip coil to be actuated over a range of values of said energy in said conductor.

14. The combination as claimed in claim 10 wherein said circuit element comprises a diode which conducts when said switching means is actuated by said timing circuit.

15. The combination as claimed in claim 19 wherein an energy storage means is disposed between said first set of terminals of said sensing and empowering circuit to store the peak value of voltage impressed across said resistance means for a predetermined time.

16. The combination as claimed in claim 15, wherein said energy storage means comprises a capacitance element.

17. The combination as claimed in claim 10 wherein said electrical circuit will fail to a condition where less than said predetermined amount of said energy will cause actuation of said trip coil in the absence of said resistance means.

18. A circuit interrupter comprising:
a trip coil and separable main contacts connected to the line conductor of an electrical power system comprising;
an energy sensing means having output terminals and cooperating with said line conductor for sensing the amount of energy present in said line conductor at any instant of time, and to provide at said output terminals an electrical signal which is related to the amount of said energy in said conductor;
a combination sensing and empowering circuit having input terminals electrically connected to said output terminals of said energy sensing means for receiving said electrical signal from said energy sensing means and deriving energy therefrom, said combination sensing and empowering circuit having a first set of output terminals for providing a signal thereat related to the instantaneous state of said electrical signal from said sensing means and a second set of output terminals for providing power thereat related to said derived energy;
a timing circuit having an output terminal and input terminals connected to said first set of output terminals of said combination sensing and empowering circuit for providing a signal at said output terminal at a predetermined time after a predetermined magnitude of said signal related to said amount of said energy is present at said signal input terminals of said timing circuit; and
a switching means having main terminals which are connected in circuit relationship with said trip coil and an actuating terminal which is connected to said output terminal of said timing circuit, said circuit combination of said switching means and said trip coil being electrically connected in circuit relationship to said second set of output terminals of said combination sensing and empowering circuit, said switching means being actuated to a state which causes said tripping coil to conduct electrical current to thereby actuate the opening of said main contacts of said circuit interrupter, said sensing and empowering circuit providing said signal at said first set of output terminals thereof to begin actuation of said trip coil at said predetermined time when said latter signal is of said predetermined magnitude, but not substantially providing said power at said second set of output terminals thereof at this time, said sensing and empowering circuit providing said power at said second set of output terminals thereof after said electrical conduction in said trip coil has begun to thereby provide the energy to continue electrical conduction in said trip coil, but not substantially further providing said signal at said first set of output terminals thereof at this later time.

* * * * *